Sept. 6, 1938.  A. KINDELMANN ET AL  2,129,093
CLAW AND REGISTRATION PIN MECHANISM
Filed June 8, 1934  4 Sheets-Sheet 1

INVENTOR-
ALBERT KINDELMANN.
JULIUS PEARLMAN.
WILLIAM OSTRANDER.
BY Austin + Dix
ATTORNEYS Sept. 6, 1938.         A. KINDELMANN ET AL         2,129,093
            CLAW AND REGISTRATION PIN MECHANISM
                Filed June 8, 1934        4 Sheets-Sheet 2
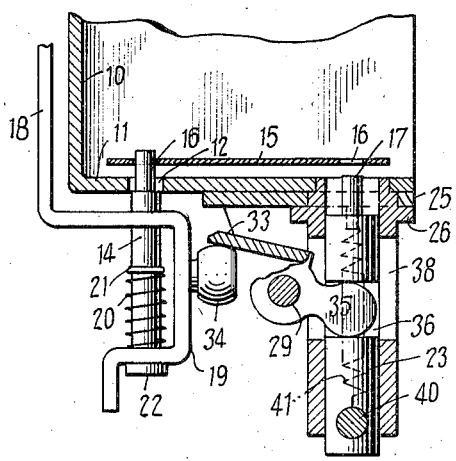
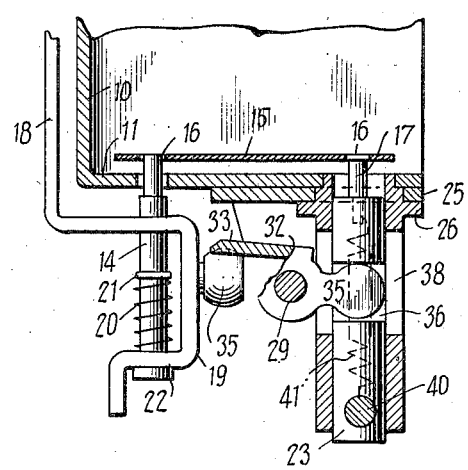
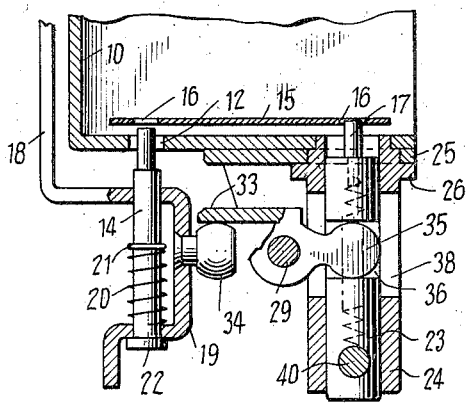
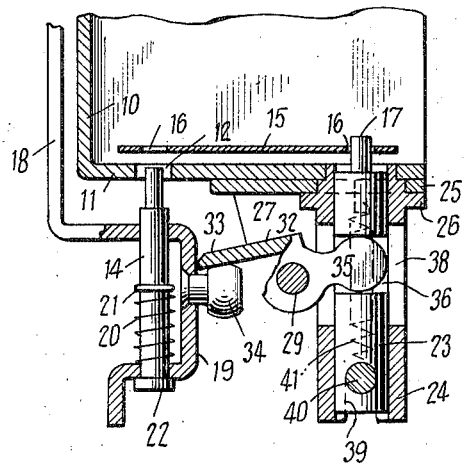
INVENTOR-
ALBERT KINDELMANN.
JULIUS PEARLMAN.
WILLIAM OSTRANDER.
BY Austin & Dix
ATTORNEYS Sept. 6, 1938.  A. KINDELMANN ET AL  2,129,093
CLAW AND REGISTRATION PIN MECHANISM
Filed June 8, 1934   4 Sheets-Sheet 3
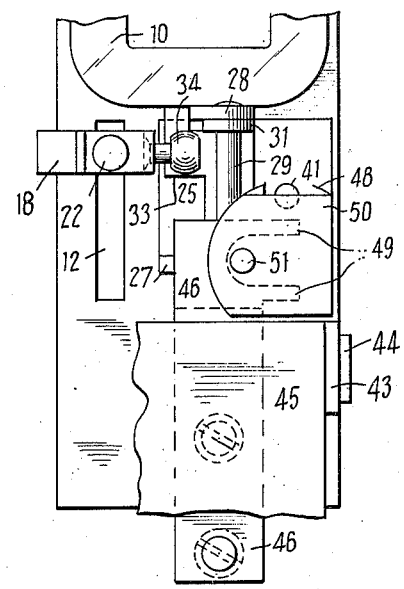
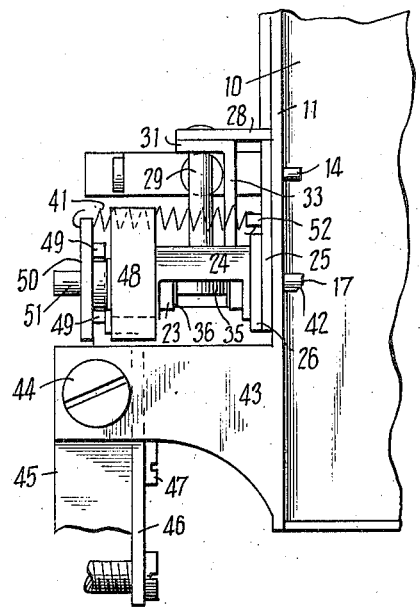
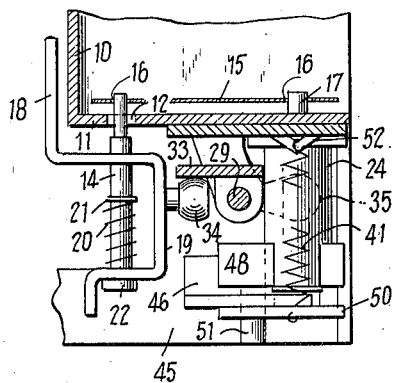
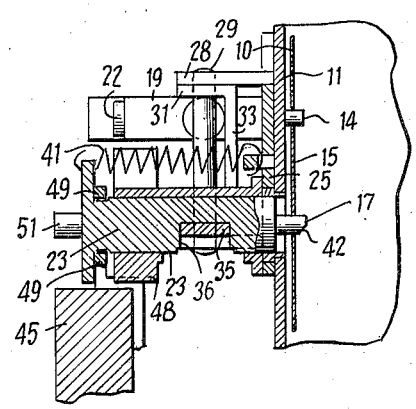
INVENTOR
ALBERT KINDELMANN.
JULIUS PEARLMAN.
WILLIAM OSTRANDER.
BY Austin & Dix
ATTORNEYS Sept. 6, 1938.    A. KINDELMANN ET AL    2,129,093
CLAW AND REGISTRATION PIN MECHANISM
Filed June 8, 1934    4 Sheets-Sheet 4

INVENTOR
ALBERT KINDELMANN.
JULIUS PEARLMAN
WILLIAM OSTRANDER
BY
ATTORNEYS

Patented Sept. 6, 1938

2,129,093

UNITED STATES PATENT OFFICE 2,129,093

CLAW AND REGISTRATION PIN MECHANISM

Albert Kindelmann, Floral Park, and Julius Pearlman, New York, N. Y., and William Ostrander, Roselle Park, N. J., assignors to International Projector Corporation, New York, N. Y., a corporation of Delaware Application June 8, 1934, Serial No. 729,594

9 Claims. (Cl. 88—18.4)

This invention relates to amateur motion picture cameras and has particular reference to mechanisms therein whereby the film is advanced intermittently past the exposure opening and firmly held from movement during exposure.

A feature of the invention is to provide a simple and efficient mechanism whereby a claw will intermittently engage and release the film and advance it past the exposure opening and cooperatively operate a stop pin mechanism whereby the action or movement of the claw mechanism will operate the pin mechanism either partly or completely.

A further feature of this invention is to provide a mechanism in which the variations in the space distance between sprocket holes in the film which are engaged by the claw and pin will not affect the proper engagement of the pin to hold the film from movement at the proper time.

Further and more specific features, objects, and advantages will more clearly appear from a consideration of the specification hereinafter when taken in connection with the accompanying drawings which form part of the specification and which illustrate present preferred forms of the invention.

Generally considered, the invention provides a simple claw mechanism which will operate to move forward and engage the holes in a film and then move it downwardly. As it moves forward to engage the film an element associated with the claw mechanism will in each and every case engage part of a stop pin mechanism to withdraw a stop pin from engagement with the film. As the claw then moves downwardly with the film it will proceed a certain distance in this direction when it will release cooperative connection with the pin mechanism, whereupon a spring mechanism connected to the pin mechanism will automatically advance the pin into pressing engagement with the surface of the film so that as soon as a hole is presented opposite the pin it will snap thereinto. In some cases the pin level is even with the top of the stroke of the claw and in other cases the pin level is even with the bottom of the claw stroke. In the latter case the actuation of the pin with the holes is made absolutely independent of the possibility as to whether or not the vertical distance between film holes engaged by the pin are variable, due to expansion of the film or shrinkage thereof.

In another form of the invention, the claw mechanism not only is associated mechanically with the pin mechanism to withdraw the pin at the top of the claw stroke but is also associated therewith at the bottom of the claw stroke to positively advance the pin into the film holes in addition to the advancing tendency of the spring above mentioned.

Present preferred forms of the invention are shown in the drawings of which,

Fig. 5 is a view similar to Fig. 3 showing the parts in another position;

Fig. 6 is a view similar to Fig. 5, showing the parts in still another position;

Fig. 7 is a view similar to Fig. 6, showing the parts in still another position;

Fig. 8 is a view similar to Fig. 7, showing the parts in still another position;

Fig. 9 is a front elevation of a modified form of the invention;

Fig. 10 is a side elevation of the parts shown in Fig. 9;

Fig. 11 is a horizontal section taken through the parts shown in Fig. 9;

Fig. 12 is a vertical section taken through the registration pin structure shown in Fig. 11;

Figure 1:
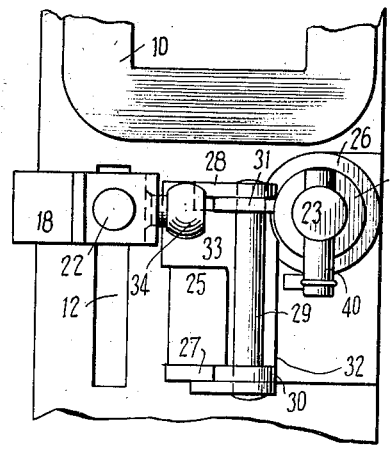
Fig. 1 is a front elevation of part of the camera, showing the claw and registration pin structure.
Figure 2:
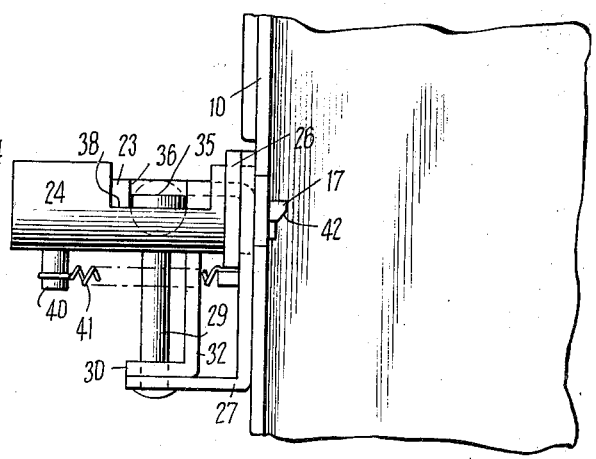
Fig. 2 is a side elevation of the same.
Figure 3:
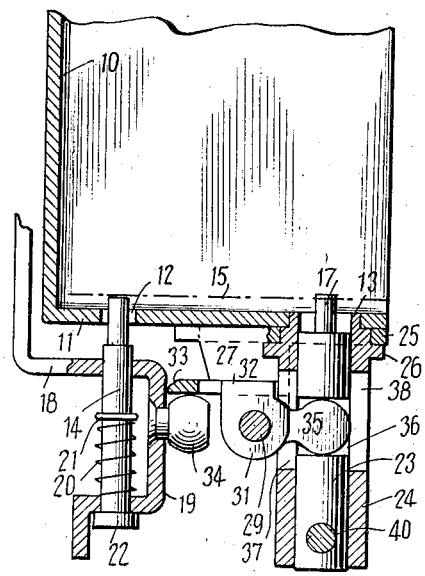
Fig. 3 is a horizontal section taken through Fig. 1.
Figure 4:
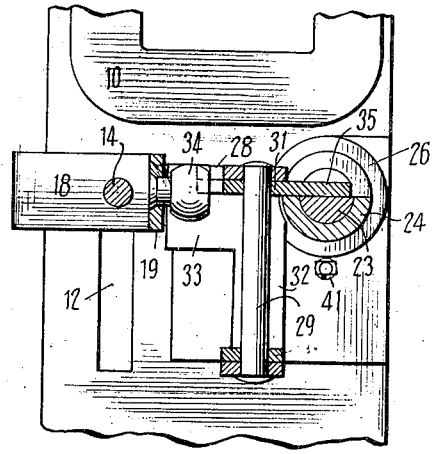
Fig. 4 is a partial vertical section taken through the registration pin of Fig. 2.

As shown in the drawings, which illustrate the present preferred forms of the invention, the structure concerns a moving picture camera of the amateur type in which the film is moved past an exposure opening by means of an intermittently operated claw and in which the film is held during the exposure period by means of a registration or stop pin which mechanically cooperates with the mechanism which drives the claw.

The camera is provided with a casing 10 having a front wall 11 in which there is disposed a vertical slot 12 and an aperture 13 as shown in Figs. 1 to 8 inclusive. In these figures, the aperture 13 is disposed across the wall 11 from the top of the slot 12. A claw 14 is adapted to project into the slot 12 and to move up and down therein in a substantially rectilinear path. At the top of its stroke it will move practically directly inward toward the film 15 which has holes 16 therein and also moves the stop or registration pin. As it does so the claw 14 enters the holes 16 and then starts to move downwardly in substantially a straight line taking the film 15 with it. At the bottom of the stroke, the claw 14 starts to move practically directly backward out of the holes 16 and as it does so, and before the claw 14 is out of its hole, a registration or stop pin 17, the front face of which has been sliding against the film 15, will be moved forward by spring action to hold the film 15 by entering one of the other series of holes 16 while the claw is moving upwardly to start a new cycle of operations. As the claw 14 moves inwardly again to engage the film 15, the stop pin 17 moves directly outward to release the film 15. In this portion of the cycle the pin 17 is not out of its hole until the claw 14 has entered its hole. Thus the film is never, even for an instant, without at least a claw or a pin in engagement therewith so that the continuous take-up mechanism in the film magazine cannot disturb film at aperture during exposure or wind up the film too rapidly.

The claw 14 is mounted on an arm 18 which has a U-shaped portion 19 acting as a journal for the claw 14. A spring 20 extends between a shoulder 21 on the claw and the U-shaped portion to always urge the claw member forward. The rear end of the claw member 14 is formed with a stop shoulder 22 to limit the extent to which the spring 20 can move the claw forward in its journals. This spring 20 will allow claw 14 to move backward if, when the magazine is inserted into the camera, it happens that a hole in the film 15 does not happen to lie, at that instant, opposite to and in registration with the end of the claw 14. Thus the claw 14 cannot punch a hole in the film. The claw member 14 and its supporting arm 18 are driven by means of a set of cams (not shown) which gives to the claw the desired rectangular movement.

The registration or stop pin 17 is mounted and preferably integrally formed on the front end of a plug 23. This plug 23 slides in a sleeve 24 which has its front end fastened in the aperture of a plate 25 which is held against the wall 11 by being soldered thereto or connected in any other suitable manner. The rest of the parts supported by the plate 25 are assembled therewith and thereon previous to the mounting of the plate 25 on the wall 11. This plate 25 has an opening in which the sleeve 24 is fastened and lying between the wall 11 and a flange 26 on the forward portion of the sleeve 24. The lower end of this plate 25 has a horizentally extending portion 27 and at its upper end has a horizontally extending portion 28 which portions 27 and 28 act as journals for a vertical shaft 29. This shaft is rotatable and supports the horizontal portions 30 and 31 of a vertical plate 32. This plate 32 has a vertical outwardly extending wing 33 near its upper end and a portion of this wing 33 lies forward of and in the path of a knob 34 mounted on the outer face of the U-shaped portion 19 of the claw operating arm 18 above mentioned. Extending outwardly over the plug 23 is an operating arm 35 formed preferably integrally on the horizontal portion 31 of the vertical plate 32 above mentioned. This arm 35 extends into a recess 36 cut in the upper face of the plug 23. To permit this the side walls of the sleeve 24 are cut away as at 37 and 38. A slot 39 is formed in the rear lower wall of the sleeve 24 and through this slot projects the lower end of a bar 40 depending from the rear end of the plug 23. A spring 41 extends from this bar 40 and is fastened at its other end to the face of the plate 25 in any suitable manner. This spring 41 will therefore urge the plug 23 and consequently the registration or stop pin 17 forwardly at all times. The front end of the stop pin 17 is beveled upwardly as shown at 42 (Fig. 2) so as to permit its ready entrance into the holes 16 of the film 15.

In the modified form of the invention shown in Figs. 9, 10, 11, and 12, the registration pin 17 is disposed at a point level with the bottom of the stroke of the claw member 14 instead of level with the top of said stroke as shown in the previous figures of the drawings. This necessitates some changes in the construction which are as follows: The arm 18 is driven as before with the claw member 14 mounted as before and moving exactly as before. The knob 34 moves as before and when it moves forward at the top of its stroke it strikes against the wing plate 33 as before. This wing plate 33 is dependent from a horizontal plate 31 mounted on and movable with the vertical shaft 29 journalled in the horizontal plates 27 and 28 extending from the vertical plate 25 held between the flange 26 on the sleeve 24 and the wall 11 as before. In this form the plug 23 and the sleeve 24 are located lower down on the frame to dispose the stop pin 17 in its new and lower position. The arm 35 in this instance also extends from the shaft 29 and into a recess as before only in this case the recess is cut from the lower face of the plug 23 instead of from the upper face as before.

In this form of the invention, the wall 11 below the level of the sleeve 24 is provided with a rearwardly projecting vertical plate 43 which by means of a bolt or set screw 44 is fastened to a member 45 constituting a fixed part of the camera. To this member 45 there is fastened a vertical plate 46 by means of a screw 47. An enlarged portion 48 is formed on the rear end of the sleeve 24. The upper end of the plate 46 is provided with laterally extending fingers such as 49 which lie between the rear end of the sleeve 24 and a disk 50 fastened to the rear end of the plug 23 and moving therewith. These fingers stop the inward movement of the plug. The disk 50 is provided with a hole receiving a horizontally extending bar or pin 51 which is secured to the ring member 48. The pin 51 prevents rotation of the plug while permitting reciprocation thereof. The plate 46 with its lateral fingers 49 provides a cushioning stop means for limiting the inward movement of the plug 23 and the stop pin 17. The spring 41 in this case extends from the disk 50 to an ear 52 on the plate 25.

Figure 14:
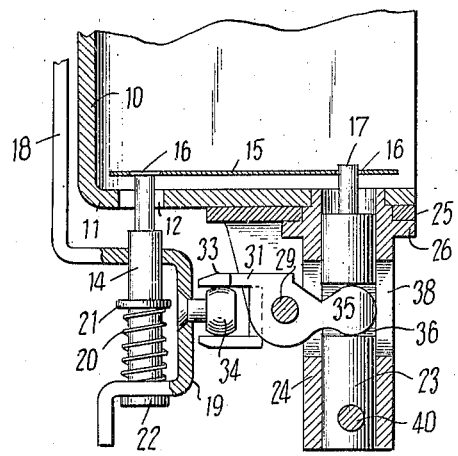
Fig. 14 is a horizontal section taken through the parts shown in Fig. 13.

In the modified form of the invention shown in Figs. 13 and 14 the construction is identical with the showing in the first eight figures except as follows:

The plate 32 has a lower wing 53 at its lower end which extends therefrom in a plane spaced from the plane of the wing 33 as shown in Fig. 14 so that this wing 53 is struck by the knob 34 as the knob moves rearwardly in the withdrawal of the claw member 14 from engagement with the film 15. In other words this last construction is such as to cause the stop pin 17 to be not only positively withdrawn, as in the first described form, but also to be positively driven forward. This form, while satisfactory, is not so desirable as the forms shown in the earlier figures on account of the difficulties in exactly lining up the claw with the film in the magazine when the magazine is inserted and without punching a hole in the film.

In describing the operation of the invention, the form thereof shown in the first eight figures will be first considered: Referring to Fig. 8, it will be seen that the claw element 14 is moved forward to its full engaging position with respect to the film and that the stop pin 17 is withdrawn to the fullest extent. At this moment the drive of the claw moves the claw 14 downwardly whereby to move the film past the exposure opening. After the claw has moved down a certain distance the knob 34 rises off the wing plate 33 and thus allows the spring 41 to move the stop pin forward against the film 15 so that its forward face rides on the film until the next hole 16 comes along when the stop pin 17 will ride into the hole and instantly arrest the movement of the film.

When the claw reaches its lowermost position its drive mechanism causes it to start to withdraw from the holes 16, and in the form shown it does so independently of the stop pin 17 since that is controlled as to its forward movement by means of the spring 41. As the claw has been completely withdrawn, then its drive mechanism starts to move it straight upwardly to the top of its outer path, at which time it starts to move substantially straight inward again. As it starts inwardly again at the top of its stroke, it will engage the wing plate 33 which is in its upper path and will thus start to positively withdraw the stop pin 17 from the holes 16. This progressive action is shown in Figs. 5, 6, 7, and 8. When the position of Fig. 8 is reached then the cycle above described is repeated. Thus it is seen that the claw mechanism is instrumental in withdrawing the stop pin but that as soon as the claw starts down a little way on its movement of the film, it releases its control of the stop pin, which is then actuated forwardly to engage position by the spring action, so that as soon as a hole is brought in front of the pin it snaps into it automatically. The bevelled front face of the stop pin 17 facilitates this action.

In the form of the invention shown in Figs. 9, 10, and 11 and 12 the action is exactly the same as to the operation and operative relation of the claw and the stop pin preceding, but in this case the stop pin 17 is at the bottom of the claw movement so that as the claw brings the film down and reaches the bottom end of its stroke, the correspondingly opposite hole 16 is brought with exactness in front of the stop pin 17 which then as before snaps into the hole to hold the film while the claw is being withdrawn from the film and moved upwardly to again reengage the film for additional movement. By providing the stop pin at the bottom of the stroke instead of at the top of the claw stroke, the likelihood that variations in vertical distance between film holes will prevent proper engagement of the stop pin will be avoided since in this latter form the stop pin always engages with the hole corresponding to the one brought down by the claw whereas in the first form the stop pin engages with the corresponding hole immediately above the one brought down by the claw. Therefore the claw always brings positively down two holes which are level with each other no matter how much the vertical distance between holes may vary due to expansion or shrinkage. In this form of the invention also the stop pin is only withdrawn by positive cooperation with the claw, and it is advanced automatically by spring action.

Figure 13:
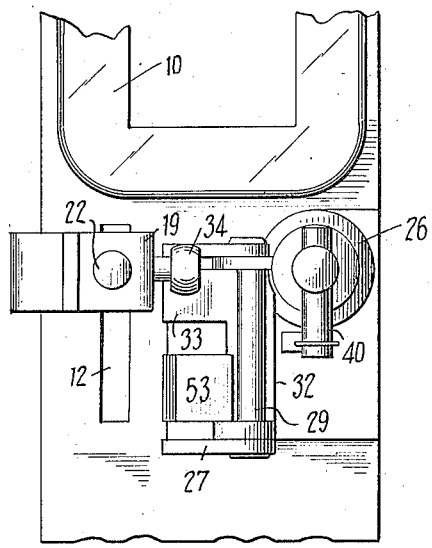
Fig. 13 is a front elevation of a further modification of the invention.

In the form shown in Figs. 13 and 14, the additional wing plate 53 as described will cause the claw as it draws back at the bottom of its stroke to positively advance the stop pin 17 in cooperation with the forward urging tendency of the spring 41. Thus the stop pin 17 in this form is positively withdrawn and advanced by the advance and withdrawal of the claw. This form is shown with the stop pin disposed at the top of the stroke of the claw but it is to be understood that this form with the double wing will and can also operate with the stop pin 17 disposed at the bottom of the claw stroke as shown in Fig. 10.

Thus it will be observed that the invention contemplates the provision of simple and efficient forms of the invention whereby the operation and cooperation of the claw and the stop pin are made accurately and simply and effectively at all times so that the film is positively advanced and positively and accurately held in position during exposure with a minimum of wear and tear on the parts and on the film itself. In the one form shown the variations in the hole distance vertically on the film is allowed for so that the engagement of the stop pin at the proper time is made positively independent of any such variations as may exist. The parts are made and related simply and with due respect to their need for ruggedness and strength so that they may operate at high speed over long periods of time without any need for adjustment, repair, and replacement.

While the invention has been described in detail and with regard to present preferred forms thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed is:

1. In a film operating device, a claw for moving the film, a stop pin for holding the film and being disposed on the apparatus to engage the film within the length range of movement of the film feeding claw, a knob mounted on the claw, a wing engaged by the knob, a plate on which said wing is disposed for oscillation, a finger on the plate, a plug on which the pin is mounted, said finger engaging said plug, a sleeve in which said plug is adapted to slide, and a spring engaging the plug tending to urge the plug toward the film as the wing is released from the knob.

2. In a film operating device, a claw for moving the film through the intermediary of the holes along the side edges of the film, said claw having a vertical stroke in moving the film and in returning to start another stroke, a stop pin for holding the film and located on a plane level with the bottom of the claw stroke and in line to engage with the set of film holes opposite to that engaged by the claw, a knob mounted on the claw mechanism, a wing engaged by the knob, a plate on which said wing is disposed for oscillation, a finger on the plate, a plug on which said pin is mounted, the lower face of said plug having a recess cut therein, said finger engaging in said recess, a sleeve in which said plug is adapted to slide, a disk on the rear end of the plug, a spring extending from the disk to the wall of the sleeve support, and cushioning stop means disposed between the rear end of the sleeve and the adjacent face of the disk.

3. In a film operating device, a claw for moving the film through the intermediary of the holes along the side edges of the film, said claw having a vertical stroke in moving the film and in returning to start another stroke, a stop pin for holding the film and located on a plane level with the bottom of the claw stroke and in line to engage with the set of film holes opposite to that engaged by the claw, a knob mounted on the claw mechanism, a wing engaged by the knob as the claw moves forward at the top of its stroke to engage the film, a plate on which said wing is disposed for oscillation, a finger on the plate, a plug on which said pin is mounted, the lower face of said plug having a recess cut therein, said finger engaging in said recess, a sleeve in which said plug is adapted to slide, a disk on the rear end of the plug, a spring extending from the disk to the wall of the sleeve support, cushioning stop means disposed between the rear end of the sleeve and the adjacent face of the disk, and a second wing on the oscillatable plate disposed to be engaged by the knob on the claw mechanism when the claw is being withdrawn from the film whereby the pin is positively moved forward to engage the film as the film is released by the claw.

4. Apparatus for moving film strip, comprising in combination, a feeding member having a vertical feeding stroke and a horizontal stroke at the ends of the feeding stroke, a stop member having a horizontal stroke, an operating element mounted on and having the same movement as said feeding member, and means connected with said stop member which is engaged by said operating element when said feeding element moves horizontally at one end of its vertical stroke for moving said stop member in one direction, said operating element disengaging said means after said feeding means begins its vertical stroke but before it reaches the end of its vertical stroke for the purposes set forth.

5. Apparatus as set forth in claim 4 in which said stop-connected means includes parts which are engaged by said operating element at each end of the vertical stroke of the film feeding member whereby to move the stop member toward the film at one end and away from the film at the other end and to leave the stop member free from control during the latter parts of the vertical strokes of the feeding member.

6. Apparatus as set forth in claim 4 which further comprises resilient means which constantly urges said stop member inward toward said film and further resilient means for limiting the inward movement of the stop member.

7. Apparatus for feeding film strip having sprocket holes therein, comprising in combination, a claw for feeding the film, a stop pin for holding the film and a reverse lever for operating the stop pin from the claw, said lever including a wing plate of limited length, and a part mounted on said claw adapted to engage said wing plate at times to operate said stop pin and to move off said wing plate after a given length of movement in one direction to release the stop pin from the influence of the claw.

8. Apparatus as set forth in claim 7 which further includes in combination, a spring for moving said stop pin when released from the influence of the claw.

9. Apparatus as set forth in claim 7 which further includes in combination, a second wing plate of limited length on said lever adapted to be engaged by said part on the claw for moving the stop pin in the opposite direction to that produced by action of the first wing plate.

ALBERT KINDELMANN.
JULIUS PEARLMAN.
WILLIAM OSTRANDER.